Figure 1:
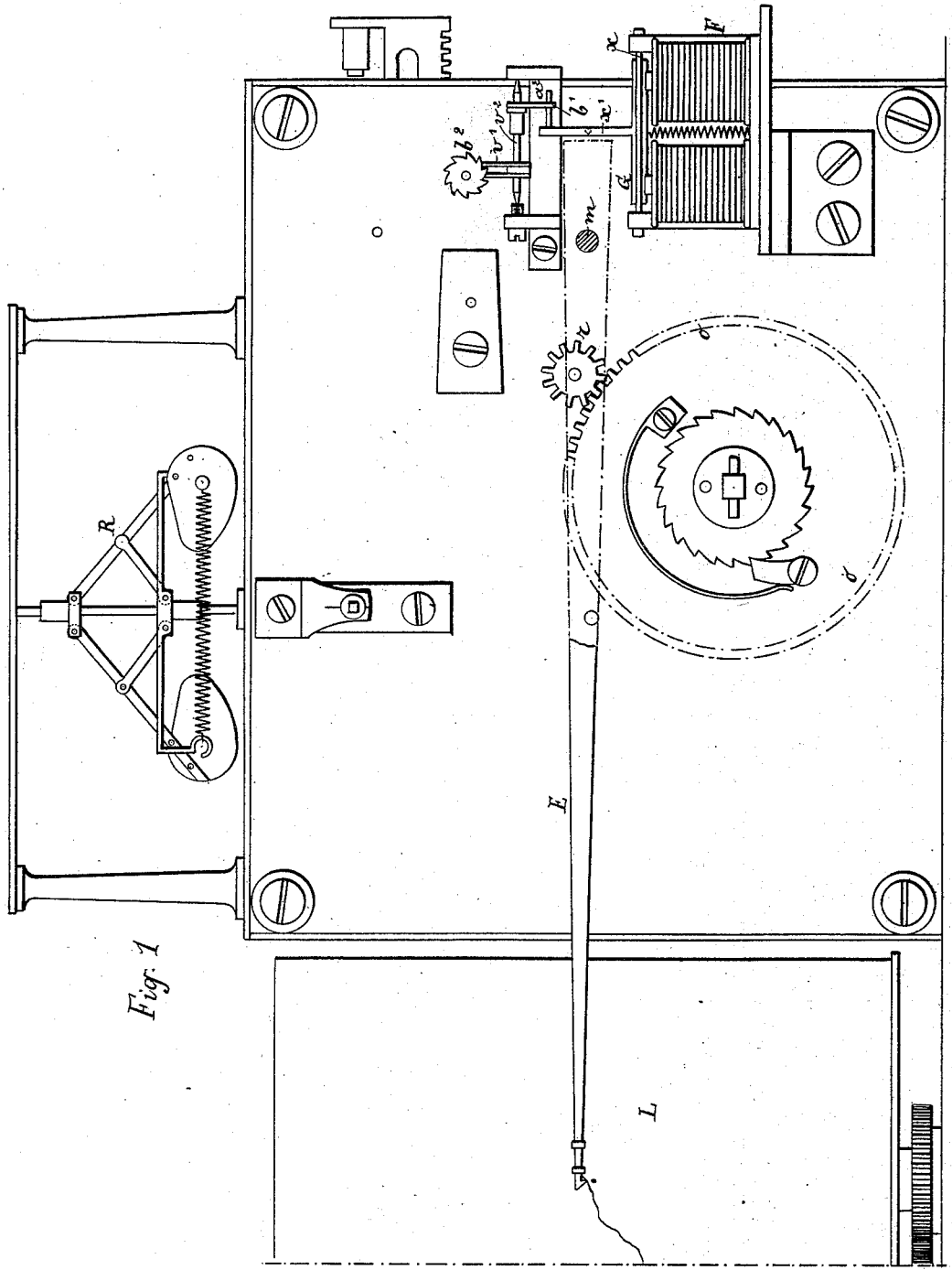

(No Model.)  5 Sheets—Sheet 3.

F. RICHARD.
SPEED RECORDER.

No. 410,023. Patented Aug. 27, 1889.

WITNESSES:

INVENTOR:
Felix Richard,
By his Attorneys,
Arthur E. Fraser & Co.

(No Model.) 5 Sheets—Sheet 5.
F. RICHARD.
SPEED RECORDER.

No. 410,023. Patented Aug. 27, 1889.

WITNESSES:

INVENTOR:
Felix Richard,
By his Attorneys,
Arthur E. Fraser & Co.

UNITED STATES PATENT OFFICE.

FELIX RICHARD, OF PARIS, FRANCE, ASSIGNOR TO THE SOCIÉTÉ RICHARD FRÈRES, OF SAME PLACE.

SPEED-RECORDER.

SPECIFICATION forming part of Letters Patent No. 410,023, dated August 27, 1889.

Application filed March 6, 1889. Serial No. 302,121. (No model.) Patented in England February 15, 1888, No. 2,309.

*To all whom it may concern:*

Be it known that I, FELIX RICHARD, a citizen of the French Republic, residing in Paris, France, have invented certain new and useful Improvements in Speed-Indicators, of which the following is a specification.

This invention has been patented in England, No. 2,309, of February 15, 1888.

The object of my invention is to produce an apparatus which shall indicate and inscribe on a record-sheet or diagram-paper the speed of any moving part whatever situated at any distance from the indicating and recording apparatus. The speed to be measured is given not by its absolute value, but by the value of the relation of the speed to be measured to a constant speed taken as a unit. Thus, for example, let us suppose that the moving part, situated—say, at a distance—the speed of which is to be indicated acts upon an organ or element of the indicator which is driven at a constant speed. Let us suppose, furthermore, that this action has, for effect, to counterbalance, nullify, or counteract partially or entirely, or to run ahead of the rotative action of the indicator at constant speed. Then one of three results will ensue, namely: first, the speed to be measured will be slower than the constant speed of the recorder, and in this case the influence of the indicator will make itself felt; or, second, the speed to be measured will be the same as that of the constant speed, which will result in equilibrium and the indicator will be counterbalanced; or, third, the speed to be measured will be greater than that of the constant speed, and the indicating apparatus in this case will exhibit the difference in a manner the opposite of that in the first case. It is thus by comparison with a typical speed, or, more exactly, by the measure of the relations between the speed to be measured and a typical speed, that I determine the measurement of speed, and which I indicate and record. The apparatus which I have devised for obtaining this result is represented in the several figures of the drawings annexed to this description. It comprises the several parts or elements following, which I will in turn describe in detail.

First. A clock-work mechanism giving a uniform speed, suitably governed, and which imparts constant rotation to a disk, which, in turn, drives, through the medium of friction, an arbor carrying a screw-thread or worm, and movable longitudinally.

Second. A worm-wheel engaging the worm on said arbor, and driven with a motion (continuous or intermittent) at a variable speed coincident with or proportional to that of the moving part the speed of which is to be measured. Preferably, the speed of this worm-wheel is governed from said moving part through the medium of an escapement controlling the running down of a clock-work, by which clock-work the worm-wheel is driven.

Third. The connection of the moving part the speed of which is to be measured when it is situated at a distance with the said escapement through the intermediation of an electro-magnet which receives an electric current at each turn of the moving part, and the armature of which magnet determines the successive disengagements of the wheel of the escapement.

Fourth. The arrangement of the arbor driven on the one hand by the friction-disk of constant speed and on the other part by the engagement of its worm with the worm-wheel moving at variable speed depending upon the speed to be measured, this arrangement resulting in a combination by means of which the worm serves a double function—acting as a movable screw turning in a nut by its engagement with the worm-wheel when the friction-disk drives it, and acting, on the other hand, as a rack by its engagement with this same worm-wheel when the latter is turned, in such manner that the position of the arbor at all times shows the relation between the constant speed taken as a unit and the variable speed of the worm-wheel which is connected to the moving part, which is to be observed.

Fifth. The connection of the said threaded arbor with a needle or stylus or other marker movable with reference to a drum or other carrier holding a paper divided or graduated in such manner that the point of the needle stands in relation to the divided paper at a height which depends on the relation of the speed to be measured with the constant speed which is taken as typical.

Figure 2:
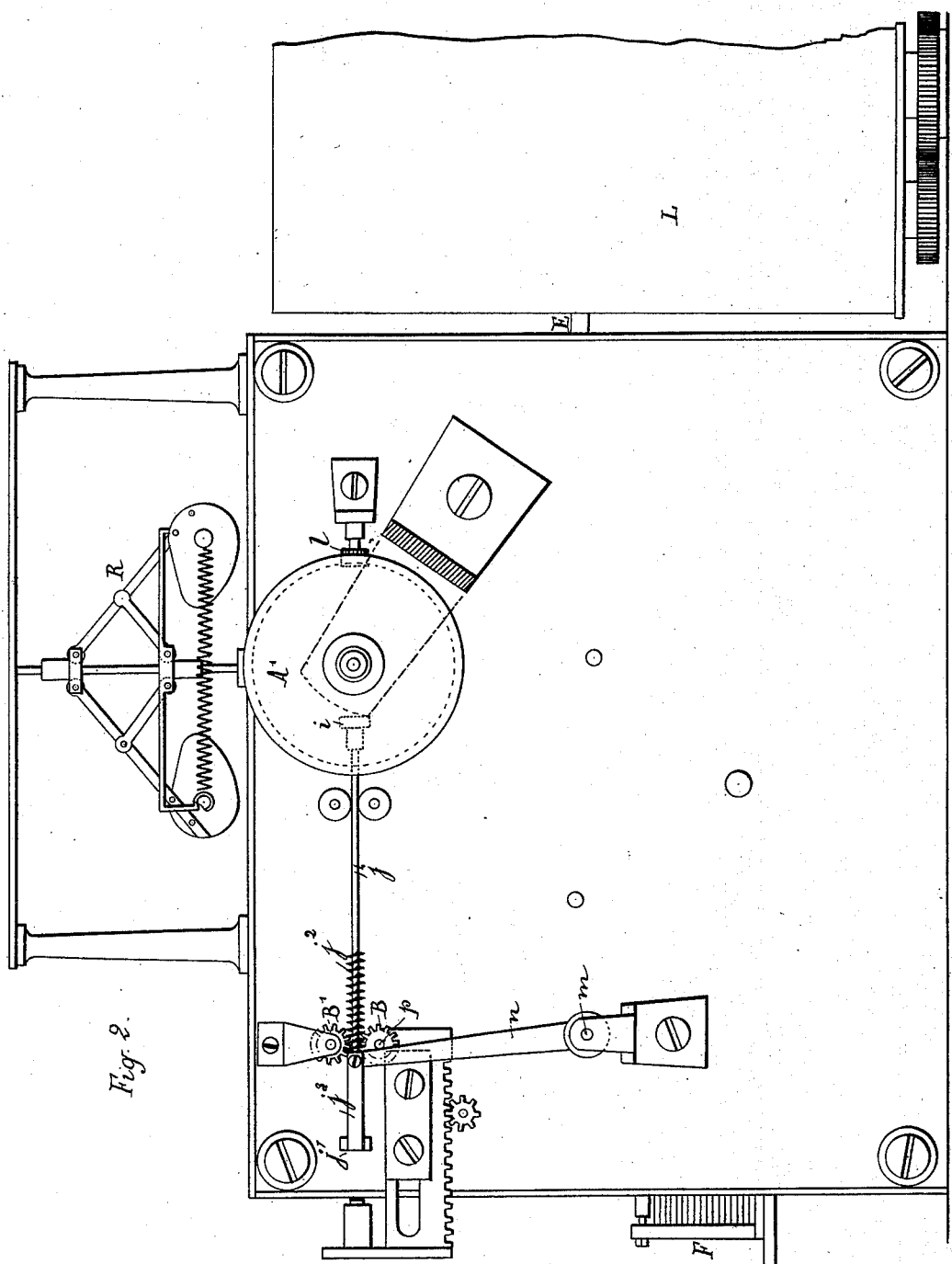
Figure 3:
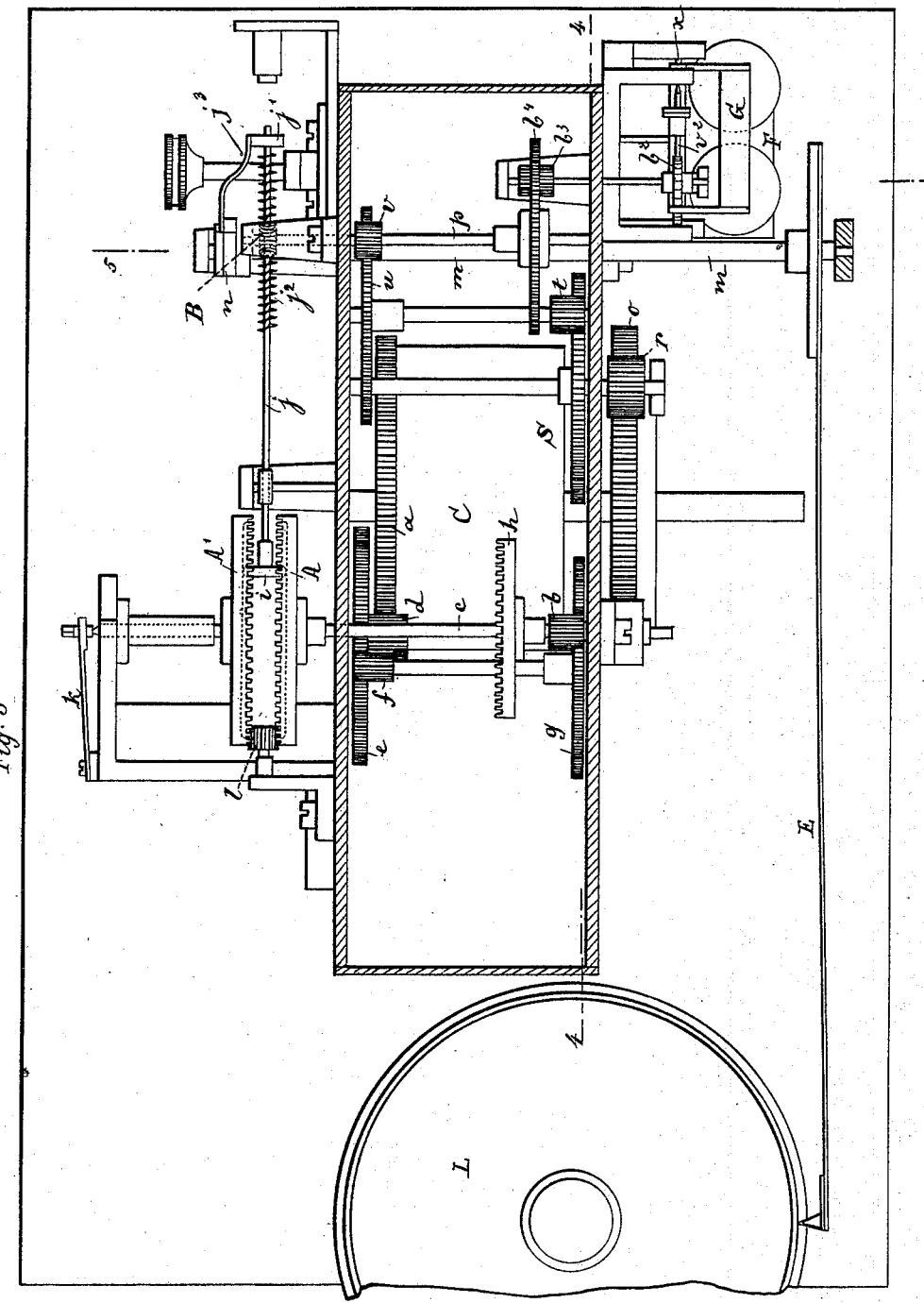
Figure 4:
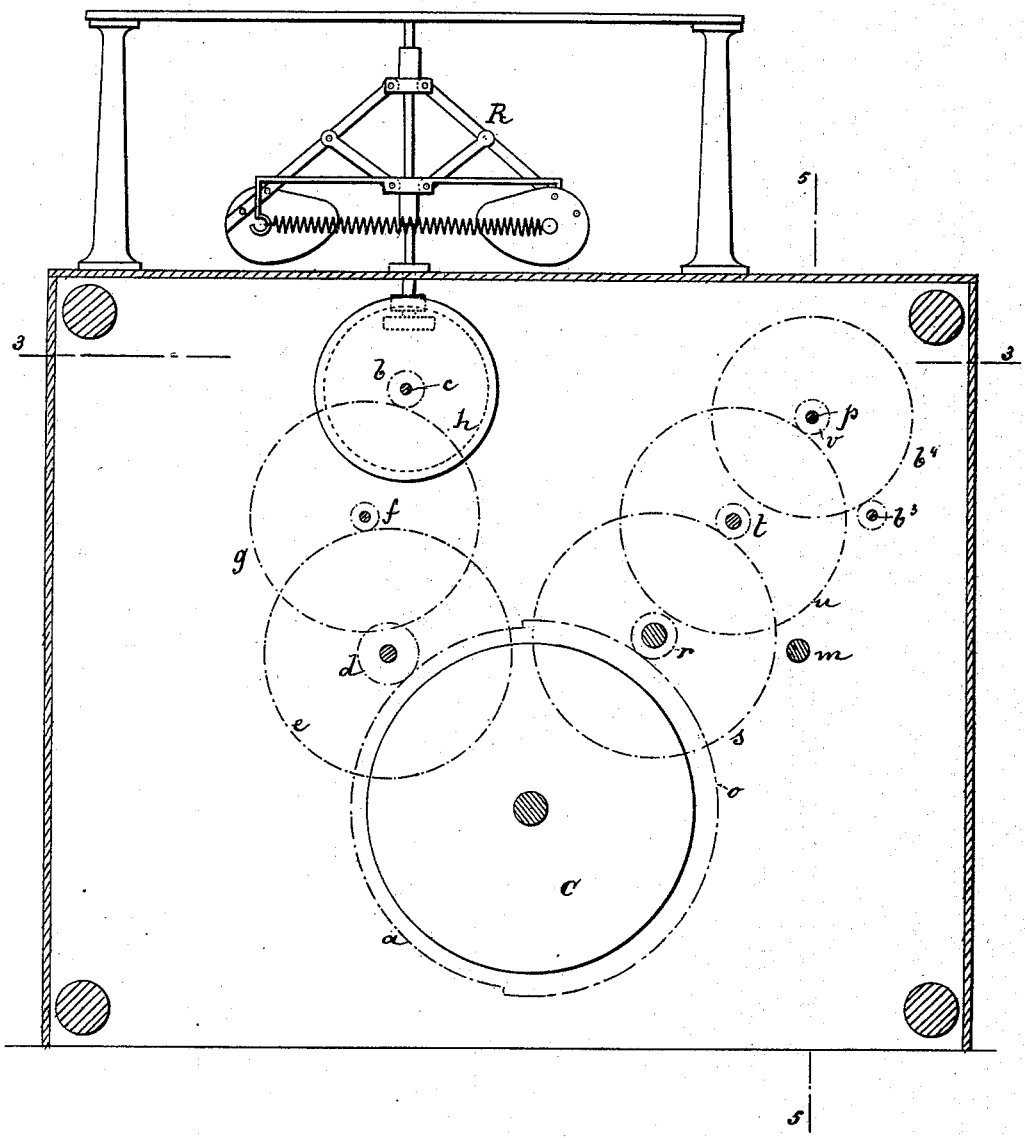
Figure 5:
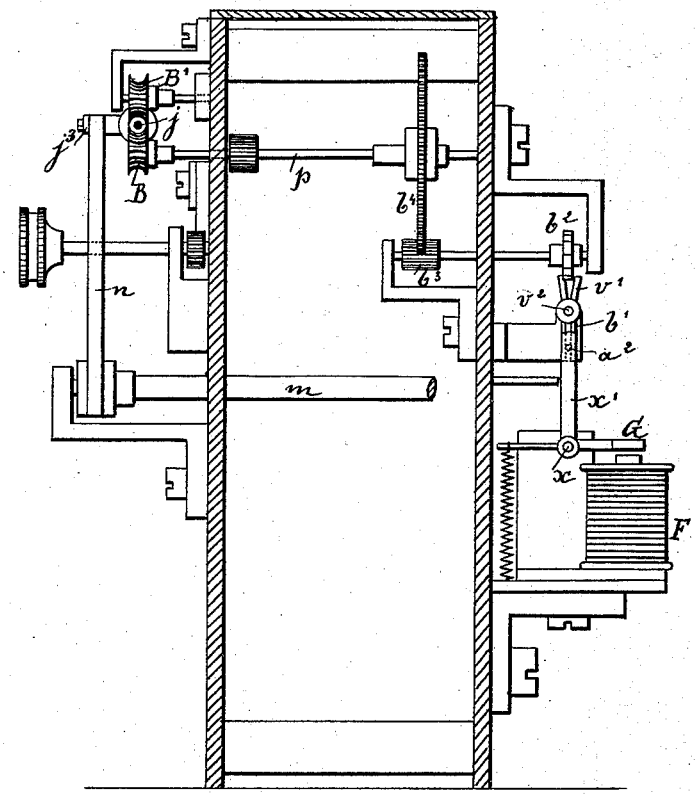

In the accompanying drawings, Figure 1 is a front elevation. Fig. 2 is a rear elevation. Fig. 3 is a plan, partly in horizontal section, on the line 3 3 in Fig. 4. Fig. 4 is a vertical longitudinal section cut in the plane of the line 4 4 in Fig. 3. Fig. 5 is a transverse section cut in the plane of the lines 5 5 in Figs. 3 and 4.

The letter A designates a friction-disk, which is driven at a constant speed, and B designates the worm-wheel or helicoidal pinion, which is driven at varying speed. The movement is imparted to the disk A and pinion B from the same spring-barrel C, which is of double effect, one of its ends driving the wheels of the disk A and the other turning the train which actuates the pinion B. The disk A is driven by the large gear $a$, which transmits movement to a pinion $b$, fixed on the axis $c$ of the disk A, this transmission taking place through the intermediation of a train consisting of the wheels and pinions $d$, $e$, $f$, and $g$. On the axis $c$ is fixed, in addition to the disk A, a toothed wheel $h$, which actuates a regulator or governor R of the Foucault class. This governor, through the intermediation of the connecting-gearing, regulates the motion of the disk A and maintains it at constant speed. The constant-speed disk A drives by friction a roller $i$, fixed on one end of an arbor $j$, which is formed with a screw thread or worm $j^2$ on or near its other end. The disk A is provided with crown-teeth driving a pinion $l$, which imparts motion to another like disk A′, which is thus driven in the opposite direction. The friction-roller $i$ is pressed between the disks A A′ by the action of a spring $k$, which presses the disk A′ toward the disk A. Thus the maximum frictional adherence of the roller $i$ to the disks A and A′ is insured. The rotation imparted to the roller $i$, and hence to the arbor $j$, tends to propel the arbor longitudinally by reason of its screw $j^2$. The longitudinal displacement of the arbor has for its effect to actuate the needle or pointer E, the latter being fixed on an axis $m$, on the opposite end of which is fixed an arm $n$, the free end of which is connected by a link $j^3$ with the end $j'$ of the arbor. The second train of clock-work driving the worm wheel or pinion B, and which is designed to propel the threaded arbor like a rack, is actuated by the toothed wheel $o$, which transmits the movement to the axis $p$ (on which the pinion B is fixed) through the intermediation of the train of wheels and pinions $r$, $s$, $t$, $u$, and $v$. This train is stopped by an escapement $v'$, which is governed by an electro-magnet F. The axis of the escapement-wheel $b^2$ carries a pinion $b^3$, meshing with a wheel $b^4$, fixed on the axis $p$. The armature G of the electro-magnet is pivoted on an axis $x$, carrying an arm $x'$, at the extremity of which is fixed a pin $a^2$, which pin engages a fork $b'$, fixed on the axis $v^2$ of the escapement $v'$. Each time that the armature G is attracted the escapement $v'$ vibrates, and the escapement-wheel $b^2$ sets free the clock-work, which runs down a certain distance and thus causes the worm-wheel B to turn, which, gearing with the worm $j^2$, propels the arbor $j$ longitudinally, this result having for its effect the displacement of the needle E on the recorder-drum L. A second worm wheel or pinion B′ is placed over the first, in order that the threaded arbor shall be properly guided.

The apparatus acts as follows: At each turn of the moving part the speed of which is to be recorded an electric current is sent to the electro-magnet F of the registering apparatus. The effect of this current is to permit the rotation of the worm-wheel B, which causes the arbor $j$ to advance, carrying the friction-roller $i$ away from the center of the disk A. If the electric contacts or impulses follow in rapid succession, the worm-wheel B continues to advance the arbor $j$; but if the speed of the moving part at a distance falls below the normal it is then the disk A, which, by turning the friction-roller $i$, causes the latter to travel toward the center of the disk by causing the screw-thread or worm $j^2$ of the arbor to act as a movable screw turning in a fixed nut, the teeth of the worm-wheel B taking the place of this nut. Hence, as will have been understood by the preceding explanation, the position of the roller $i$ is translated onto the recording-drum L, indicating exactly the speed of succession of the electrical impulses sent by the distant moving part the speed of which is being registered. So long as this part moves at a uniform normal speed the needle E is immovable and traces a horizontal line around the drum L, by reason of the rotation of this drum by means of clock-work. When the speed of the moving part falls below the normal, the needle E rises, tracing a line which ascends with more or less rapidity toward the upper part of the drum; and when the speed of the part being measured becomes faster than the normal, the needle descends more or less toward the lower part of the drum. Thus, by suitably graduating the paper carried by the drum the variations of speed above or below the normal are at once made manifest.

My speed-indicator might be utilized for observing the speed of various motors, engines, or machines situated in a workshop or factory, or even at a considerable distance. In the case of using one indicator for several different machines it will suffice to extend the electric circuit from the several machines to a table or switch board near the register and to put the electro-magnet in communication with one circuit or another by means of a plug, after the manner of telegraphic switch-boards, whereby the speed of the several machines may be taken successively one after another. It will of course be obvious that the worm-wheel B may be driven directly from the moving part the speed of which is to be measured instead of through the intermediation of an electric circuit, magnet, and escapement.

It is not absolutely essential that the speed of the disk A should be constant, as it might in some instances be desirable to measure the speed of one machine relatively to the speed of another machine when the speed of the latter might be constant or variable, and to do this it would suffice to connect the disk A to the latter machine, to be driven thereby instead of by the spring-barrel C. It is thus only essential that the disk A shall be driven at a speed which shall be accepted as typical or shall constitute the normal speed with which the actual speed of the mechanism to be measured is to be compared.

I claim as my invention the following-defined novel features and combinations, substantially as hereinbefore specified, namely:

1. A speed-indicator consisting of the combination of a disk rotating at a typical or normal speed, a worm-wheel driven at a variable speed proportional to the speed to be measured, and a driven part deriving motion from both said disk and wheel and consisting of a rotative arbor carrying a friction-roller in engagement with said disk and formed with a screw or worm in engagement with said worm-wheel, whereby when the speed of the worm-wheel falls below the normal the rotation imparted to said arbor from said disk causes its worm to act as a screw, reacting against the teeth of said worm-wheel to propel the arbor in one direction, and when the speed of the worm-wheel rises above the normal it acts upon the worm like a pinion upon a rack, to propel the arbor in the opposite direction, so that the longitudinal movements of the arbor constitute an indication of the variations of speed to be measured.

2. In a speed-indicator, the combination, with a worm-wheel driven at a varying speed proportional to that to be measured, an arbor carrying a worm meshing with said wheel and provided with a friction-roller, and a disk turning at a constant or normal speed, of a clock-work mechanism and governor for imparting rotation at such constant speed to said disk.

3. In a speed-indicator, the combination, with a disk rotating at a typical or normal speed, an arbor provided with a friction-roller driven from said disk and carrying a worm, and a worm-wheel meshing with said worm and rotating at a variable speed proportional to that to be measured, of a clock-work mechanism tending to rotate said worm-wheel, and an escapement for restraining said clock-work and determining, by connection with the part the speed of which is to be measured, the rapidity of rotation of the worm-wheel.

4. In a speed-indicator, the combination, with a disk rotating at a typical or normal speed, an arbor provided with a friction-roller driven from said disk and carrying a worm, and a worm-wheel meshing with said worm and rotating at a variable speed proportional to that to be measured, of a clock-work mechanism tending to rotate said worm-wheel, an escapement for restraining said clock-work, an electro-magnet for operating said escapement, and an electric circuit connecting said magnet with the part the speed of which is to be measured, whereby electric impulses are sent to said magnet at varying intervals proportional to variations in the speed of said parts.

5. A speed-indicator consisting of the combination of a disk rotating at a typical or normal speed, a worm-wheel driven at a variable speed proportional to the speed to be measured, and a rotative arbor extending radially of said disk and tangentially of said worm-wheel, carrying a friction-roller in engagement with said disk and formed with a screw or worm in engagement with said worm-wheel, said screw being of such direction of pitch relatively to the direction of rotation of said worm-wheel and disk that when the worm-wheel is stopped or driven at a speed slower than the normal the rotation of the arbor by the said disk causes the worm, by reacting against the worm-wheel, to propel the arbor longitudinally in such direction as to cause its friction-roller to approach the center of rotation of said disk.

6. A speed-indicator consisting of the combination of a disk rotating at a typical or normal speed, a worm-wheel driven at a variable speed, a rotative arbor movable longitudinally, carrying a friction-roller in engagement with said disk, and formed with a screw or worm in engagement with said worm-wheel, and a movable index or pointer connected to said arbor and movable to different positions by the longitudinal displacement of the arbor.

In witness whereof I have hereunto signed my name in the presence of two subscribing witnesses.

FELIX RICHARD.

Witnesses:
R. J. PRESTON,
CHARLES MARDEL.